United States Patent
Li et al.

(10) Patent No.: US 11,304,389 B2
(45) Date of Patent: Apr. 19, 2022

(54) SUB-IRRIGATION BED AND CULTIVATION APPARATUS

(71) Applicant: FUJIAN SANAN SINO-SCIENCE PHOTOBIOTECH CO., LTD., Quanzhou (CN)

(72) Inventors: Jing Li, Quanzhou (CN); Juan Kang, Quanzhou (CN); Lishan Chen, Quanzhou (CN); Zhuo Zhan, Quanzhou (CN)

(73) Assignee: FUJIAN SANAN SINO-SCIENCE PHOTOBIOTECH CO., LTD., Quanzhou (CN)

( * ) Notice: Subject to any disclaimer, the term of this patent is extended or adjusted under 35 U.S.C. 154(b) by 147 days.

(21) Appl. No.: 16/610,087

(22) PCT Filed: Apr. 2, 2019

(86) PCT No.: PCT/CN2019/081069
§ 371 (c)(1),
(2) Date: Nov. 1, 2019

(87) PCT Pub. No.: WO2020/093650
PCT Pub. Date: May 14, 2020

(65) Prior Publication Data
US 2021/0204497 A1    Jul. 8, 2021

(30) Foreign Application Priority Data
Nov. 6, 2018    (CN) .......................... 201821818749.7

(51) Int. Cl.
*A01G 31/02*    (2006.01)
*A01G 31/00*    (2018.01)

(52) U.S. Cl.
CPC ........ *A01G 31/02* (2013.01); *A01G 2031/006* (2013.01)

(58) Field of Classification Search
CPC .. A01G 31/02; A01G 2031/006; A01G 9/033; A01G 9/0297
See application file for complete search history.

(56) References Cited

U.S. PATENT DOCUMENTS

| 2,188,880 A | * | 1/1940 | Lewis | .................... | A01G 31/02 |
| | | | | | 47/61 |
| 3,992,809 A | * | 11/1976 | Chew | .................... | A01G 31/02 |
| | | | | | 47/62 R |

(Continued)

FOREIGN PATENT DOCUMENTS

| CN | 202714001 U | 2/2013 |
| CN | 202890139 U | 4/2013 |

(Continued)

OTHER PUBLICATIONS

Search report and written opinion for European application EP 19 88 3030.

*Primary Examiner* — Joshua D Huson
*Assistant Examiner* — Megan J Moroney
(74) *Attorney, Agent, or Firm* — Dragon Sun Law Firm, PC; Jinggao Li, Esq.

(57) ABSTRACT

A sub-irrigation bed includes a bottom, a side wall surrounding the bottom, a water inlet, and a water outlet. A plurality of support structures is arranged on an upper surface of the bottom, and tops of at least a part of the plurality of support structures lie in the same horizontal plane. By reducing the contact area between the cultivation container and the surface of the sub-irrigation bed to reduce local water accumulation caused by surface tension, the sub-irrigation bed and the cultivation apparatus using the sub-irrigation bed provided by the present invention solve the problem of water accumulation caused by incomplete drainage and the result- (Continued)

ing problems that roots grow out of the cultivation container and seedlings grow irregularly, thereby achieving a good root control effect.

10 Claims, 5 Drawing Sheets

(56) References Cited

U.S. PATENT DOCUMENTS

| | | | | |
|---|---|---|---|---|
| 4,037,362 A * | 7/1977 | Finck | | A01G 31/02 47/59 R |
| 4,159,597 A * | 7/1979 | Olsen | | A01G 9/0297 47/58.1 R |
| 4,279,101 A * | 7/1981 | Leroux | | A01G 31/02 47/64 |
| 4,392,328 A * | 7/1983 | Walker | | A01G 31/06 47/62 C |
| 4,607,454 A * | 8/1986 | Koike | | A01G 31/02 47/63 |
| 5,400,544 A * | 3/1995 | Wien | | A01G 9/00 47/33 |
| 5,446,994 A * | 9/1995 | Chou | | A01G 27/06 47/65.6 |
| 5,983,564 A * | 11/1999 | Stragnola | | A01G 31/02 47/62 R |
| 6,442,892 B1 * | 9/2002 | Azoulay | | A01G 31/02 47/61 |
| 7,568,980 B1 * | 8/2009 | Janus | | A63B 69/3661 473/278 |
| 8,966,817 B2 * | 3/2015 | Cronk | | A01G 9/025 47/81 |
| 2006/0032129 A1 * | 2/2006 | Lai | | A01G 31/02 47/62 R |
| 2006/0112630 A1 * | 6/2006 | Kimes | | A01H 4/001 47/62 C |
| 2006/0162246 A1 | 7/2006 | Okabe et al. | | |
| 2007/0157514 A1 * | 7/2007 | Carpenter | | A01G 9/033 47/65.9 |
| 2009/0260284 A1 * | 10/2009 | Barbalho | | A01G 9/033 47/65.9 |
| 2012/0279127 A1 * | 11/2012 | Yusibov | | A01G 31/06 47/62 N |
| 2013/0180174 A1 * | 7/2013 | MacKenzie | | E04D 11/002 47/65.7 |
| 2013/0305603 A1 * | 11/2013 | Azoulay | | A01G 2/00 47/60 |
| 2014/0069009 A1 * | 3/2014 | Lin | | A01G 31/02 47/62 C |
| 2014/0090295 A1 * | 4/2014 | Fambro | | A01G 9/1423 47/62 N |
| 2014/0190079 A1 * | 7/2014 | Neola | | A01G 31/02 47/62 R |
| 2016/0183487 A1 * | 6/2016 | Kabakov | | A01G 31/02 47/59 R |
| 2018/0206421 A1 * | 7/2018 | Scott | | A01G 31/02 |
| 2019/0320604 A1 * | 10/2019 | Petrovffsky | | A01G 9/246 |

FOREIGN PATENT DOCUMENTS

| | | |
|---|---|---|
| CN | 204653110 U | 9/2015 |
| CN | 206182029 U | 5/2017 |
| CN | 107047127 A | 8/2017 |
| CN | 107637499 A | 1/2018 |
| CN | 207083744 U | 3/2018 |
| CN | 109429828 A | 3/2019 |
| KR | 100667578 B1 | 1/2007 |
| KR | 20140082554 A | 7/2014 |

* cited by examiner

SUB-IRRIGATION BED AND CULTIVATION APPARATUS

This application is the national phase entry of International Application No. PCT/CN2019/081069, filed on Apr. 2, 2019, which based upon and claimed priority to Chinese Patent Application NO. 201821818749.7, filed on Nov. 6, 2018 the entire contents of which are incorporated herein by reference.

TECHNICAL FIELD

The present invention relates to the technical field of plant cultivation, and in particular to a sub-irrigation bed and a cultivation apparatus including the irrigation bed.

BACKGROUND

With the increasing area of protected agriculture and plant factories in the world and China, the requirements for hydroponics are improved greatly, and the application of the integrated water and fertilizer management has become a major trend. Currently adopted irrigation techniques mainly include overhead spray irrigation and sub-irrigation. The overhead spray irrigation is a conventional irrigation mode of spraying water and fertilizer from top to bottom onto the stems and leaves of plants or substrates to provide nutrients for the plants, and has the disadvantages of uneven spraying, irregular growth of the plants, increased air humidity and increased plant disease incidence. The sub-irrigation mode is a novel irrigation technology which is mainly applied to container seedling production, cultivation of potted plants using nutrient solutions, and the like, in which substrates can be in direct contact with the nutrient solution, and the water and fertilizer enter the substrates from bottom to top through holes at the bottom of the cultivation container by virtue of the capillary force. In practice, after the water is drained, local water accumulation easily occurs on the surface of the irrigation bed due to the surface tension of water. As a result, the roots are likely to grow out of the cultivation container through the holes, because the roots of the growing plants tend to grow toward the place rich in water and fertilizer due to the chemotropism and hydrotropism. When seedlings are taken out from the cultivation container for transplanting after the seedling cultivation is finished, the roots may be broken and damaged, affecting the growth potential and growth speed during the seedling recovery and likely causing plant diseases.

SUMMARY

In view of the disadvantages of the prior art, an objective of the present invention is at least to provide a sub-irrigation bed and a cultivation apparatus including the irrigation bed, to solve the problem of incomplete drainage at the bottom, thereby reducing the exposure of plant roots and improving the uniformity of seedling emergence.

In order to achieve the above objective and other related objectives, an implementation of the present invention provides a sub-irrigation bed, including a bottom, a side wall surrounding the bottom, a water inlet and a water outlet, where a plurality of support structures is arranged on an upper surface of the bottom, and tops of at least a part of the plurality of support structures lie in the same horizontal plane.

In another implementation, the upper surface of the bottom is inclined downward towards the water outlet.

In another implementation, a settling pond in communication with the water outlet is formed at the bottom.

In another implementation, a filter tank is arranged at an upper part of the settling pond.

In another implementation, the filter tank is a removable filter tank.

In another implementation, a water channel in communication with the water outlet is formed on the side wall of the settling pond.

In another implementation, the water outlet is equipped with a water plug, and the water plug is inserted into the water outlet and is configured to block the water outlet from communicating with the outside of the irrigation bed.

In another implementation, the water outlet is equipped with a water plug, and the water plug is inserted into the water outlet and is configured to block the water outlet from communicating with the water channel and block the water outlet from communicating with the outside of the irrigation bed.

In another implementation, the support structure is a hollow support structure, an upper surface of the hollow support structure is in a mesh shape, and a periphery of the hollow support structure is in a mesh shape or is provided with a plurality of drainage holes. The present invention also provides a cultivation apparatus, including a cultivation container and any one of the above irrigation beds, where the cultivation container is supported on the support structures of the irrigation bed.

By reducing the contact area between the cultivation container and the surface of the irrigation bed to reduce local water accumulation caused by surface tension and further adopting a slope design to achieve complete drainage, the irrigation bed and the cultivation apparatus using the irrigation bed provided by the present invention solve the problem of water accumulation caused by incomplete drainage and the resulting problems that roots grow out of the cultivation container and seedlings grow irregularly, thereby achieving a good root control effect.

LIST OF REFERENCE NUMERALS

Figure 1:
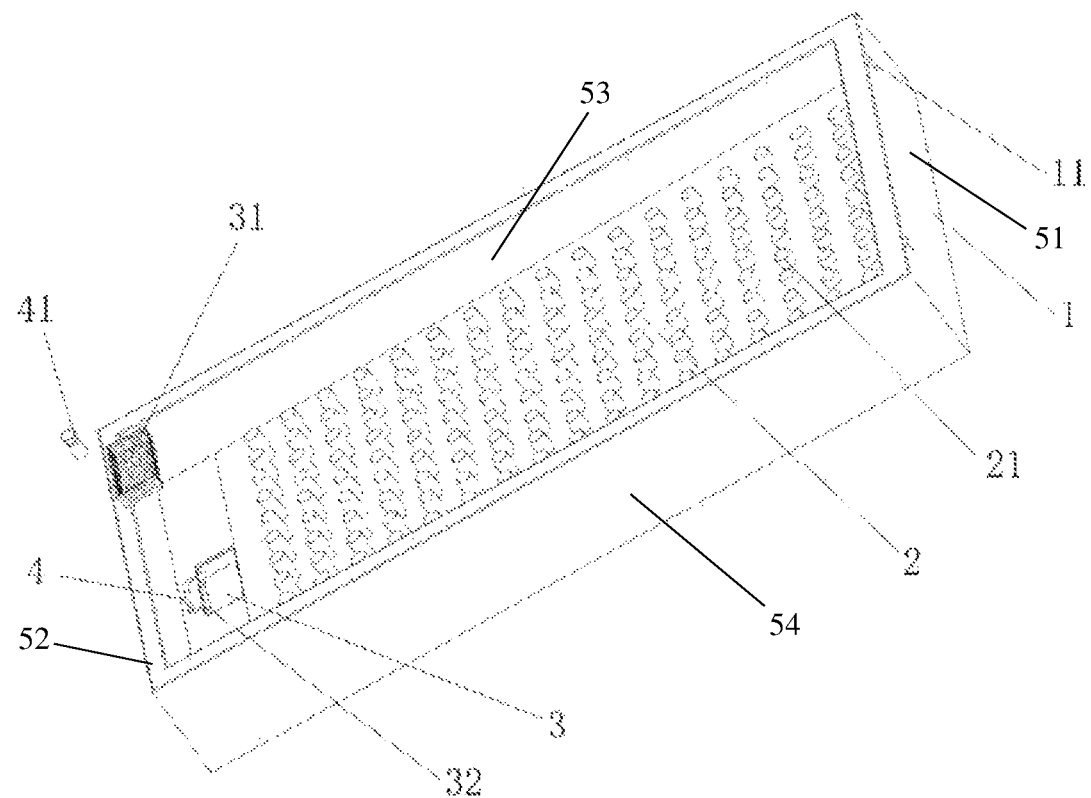
FIG. 1 shows a three-dimensional structural schematic diagram of an irrigation bed according to an embodiment of the present invention.
Figure 2:
FIG. 2 shows a top-view structural schematic diagram of an irrigation bed according to an embodiment of the present invention.

| 1 Side wall |
| 11 Water inlet |
| 2 Bottom |
| 21 Support structure |
| 22 Reinforcing rib |
| 3 Settling pond |
| 31 Filter tank |
| 32 Water channel |
| 4 Water outlet |
| 41 Water plug |
| 51 First Wall |
| 52 Second Wall |
| 53 Third Wall |
| 54 Fourth Wall |

DETAILED DESCRIPTION OF THE EMBODIMENTS

The implementations of the present invention are described below with reference to specific embodiments. Those skilled in the art can easily understand other advantages and effects of the present invention according to the content disclosed in the specification.

It should be noted that the structures, proportions, sizes, and the like shown in the drawings of the specification are only used to cooperate with the contents disclosed in the specification for understanding and reading by those skilled in the art, and it is not intended to limit the conditions under which the present invention can be implemented and therefore has no technical significance. Any modifications to structure, changes to the proportional relationship or the adjustment on the size should fall within the scope of the technical content disclosed by the present invention without affecting the effects and the objectives that can be achieved by the present invention. At the same time, the terms such as "upper", "lower", "left", "right", "middle" and "one" as used in this specification are only for convenience of description and are not intended to limit the implementation scope of the present invention, and the change or adjustment of the relative relationship is considered to be within the implementation scope of the present invention under the condition of no substantial change to the technical content.

FIG. 1 to FIG. 4 show an embodiment of an irrigation bed of the present invention. In this embodiment, the irrigation bed includes a bottom 2 and a side wall 1 surrounding the bottom 2, where the side wall 1 and the bottom 2 form a space together for containing water and fertilizer. Side wall 1 includes first wall 51, second wall 52 opposite to first wall 51, third wall 53 adjacent to first wall 51 and second wall 52, and fourth wall 54 opposite to third wall 53 and adjacent to first wall 51 and second wall 52. A plurality of support structures 21 is arranged on the upper surface of the bottom 2, and the support structures 21 may be in various shapes, such as a cylinder shape, a truncated cone shape, a taper shape, a square shape, a strip shape, a block shape and a semi-sphere shape. The support structure 21 may be solid or hollow, an upper surface of the hollow support structure is in a mesh shape, and a periphery of the hollow support structure is in a mesh shape or is provided with a plurality of drainage holes beneficial to drainage. The arrangement of the support structures may be local arrangement or global arrangement. The support structure column has a small upper surface area so as to reduce the contact area between a seedbed at the lower part (namely the bottom of the irrigation bed) and a cultivation container at the upper part to prevent water from remaining on the upper surface after the nutrient solution is discharged, and at the same time, the shape and arrangement of the support structure column do not block the return of the nutrient solution.

Figure 3:
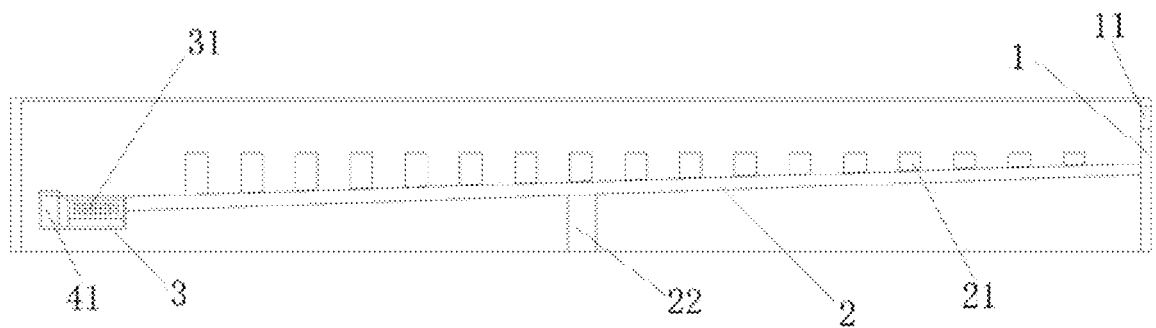
FIG. 3 shows a front-view cross-section structural schematic diagram of an irrigation bed according to an embodiment of the present invention.
Figure 4:
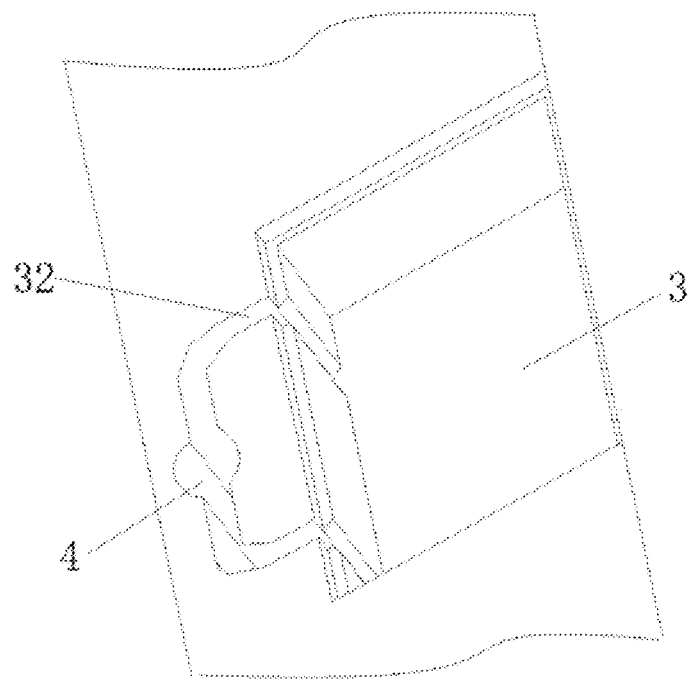
FIG. 4 shows an amplified three-dimensional structural schematic diagram of a settling pond according to an embodiment of the present invention.
Figure 5A:
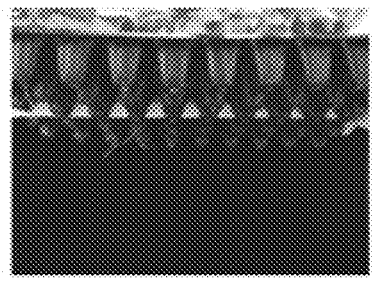
FIG. 5A shows a diagram of root growth condition during seedling growth when a sub-irrigation bed, whose bottom surface is inclined to a certain angle, including support structures is used.
Figure 5B:
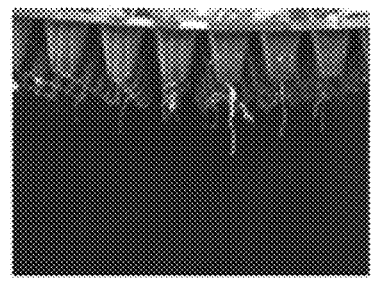
FIG. 5B shows a diagram of root growth condition during seedling growth when a sub-irrigation bed, whose bottom surface is horizontal, including support structures is used.
Figure 5C:
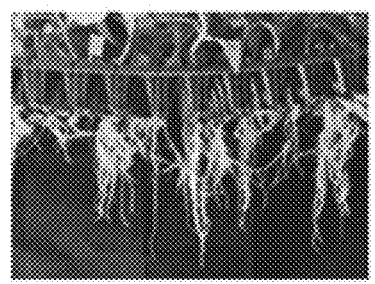
FIG. 5C shows a diagram of root growth condition during seedling growth when a sub-irrigation bed, whose bottom surface is horizontal, without support structures is used.

During use, the support structure 21 supports the cultivation container (not shown) placed thereon, and therefore the tops of the support structures 21 preferably lie in the same horizontal plane so that the cultivation container can placed horizontally. The bottom 2 may be of a solid structure or a hollow structure (as shown in FIG. 3). If the bottom 2 is of a hollow structure, a reinforcing rib 22 can be additionally arranged at the hollow part to increase the structural strength.

The side wall 1 is provided with a water inlet 11 disposed on the first wall, and water and fertilizer can be injected into the irrigation bed through the water inlet 11. The bottom 2 of one side opposite to the side wall 1 provided with the water inlet 11 is provided with a water outlet 4 disposed on the second wall, and the water outlet 4 is in communication with the outside of the irrigation bed from the lower side or the side surface of the water outlet 4. In order to facilitate the flow of the water and fertilizer from the water inlet to the water outlet, as shown in FIG. 3, in this embodiment, the upper surface of the bottom 2 is preferably inclined from the water inlet to the water outlet. In this case, the heights of the support structures 21 may be designed to gradually increase from the water inlet to the water outlet, to ensure that the tops lie in the same horizontal plane.

A settling pond 3 is formed on one side of the water outlet 4. A filter tank 31 may be arranged at the upper part of the settling pond 3, the water and fertilizer flow into the settling pond 3 through the filter tank 31, and plant debris, substrate residues, and the like contained in the water and fertilizer are filtered through the filter tank 31. Preferably, the filter tank 31 is removable, and the substrates flowing out with water can be removed easily by removing the filter tank 31 without moving the bed.

A water channel 32 in communication with the water outlet 4 is formed on the side wall of the settling pond 3. The water outlet 4 is equipped with a water plug 41, and the shape of the water plug 41 is adaptive to the shape of the water outlet 4. For example, the water plug 41 may be in a cylinder shape, a square shape, and the like. When inserted into the water outlet 4, the water plug 41 blocks the flow of the water and fertilizer from the water channel 32 to the water outlet 4, and blocks the flow of the water and fertilizer from the water outlet 4 to the outside of the irrigation bed. As shown in FIG. 1, in this embodiment, the water channel 32 is in communication with the upper surface of the bottom 2. That is, the top is of an open structure. However, in order to prevent the unfiltered water and fertilizer from directly flowing into the water channel 32, the top of the water channel 32 may also be of a closed structure.

The irrigation bed provided by the present invention can be applied to both a single-layer irrigation system and a three-dimensional irrigation system, and cooperates with a pipeline to form a circulation system. The use of the irrigation bed provided by the present invention is briefly described in conjunction with the above embodiments.

The water plug blocks the drainage hole for irrigating. After reaching the irrigation level required by the plants, the substrates begin to absorb water due to the capillary action. After the water absorption ends, the water plug is opened, the remaining water and fertilizer flow to the settling pond along a slope under action of gravity and flow into the settling pond, plant debris, substrate residues, and the like are filtered when passing through the settling pond, the water and fertilizer flow through the settling pond, then flow to the drainage holes through the water channel and flow out of the drainage holes from the lower side or the side surface, and the water and fertilizer can be drained to the irrigation bed at the lower layer through drainage in case of three-dimensional multi-layer irrigation. The filter tank can be removed and can be assembled back to the settling pond after impurities are cleared.

The above embodiments are exemplary, and a plurality of features can respectively or simultaneously adopt alternative implementations. Examples are shown as follows.

The water inlet and the water outlet are not limited to be respectively positioned at two sides of the irrigation bed and may be positioned at the same side, and the water inlet and the water outlet or one of the two may be arranged in the middle of the irrigation bed. The water inlet is not limited to be formed in the side wall of the irrigation bed and may be formed by a gap between the cultivation container and the side wall of the irrigation bed, and a water inlet hole may be formed in the cultivation container. The water outlet is not limited to be formed in the bottom of the irrigation bed, and a hole may be formed in the bottom of the side wall of the irrigation bed.

The upper surface of the bottom of the irrigation bed may also be a horizontal plane and is not limited to be an inclined plane. In case of the inclined plane, it is not only a case of inclining from one side to the other side. For example, when the water outlet is positioned in the middle of the irrigation bed, the upper surface may be inclined from the periphery to the middle. That is, the upper surface is inclined toward the water outlet.

The water plug may be omitted. As long as the water intake is greater than the water drainage amount (for example, the water inlet is larger than the water outlet), the necessary level between the bottom of the irrigation bed and the cultivation container can be ensured. In this case, a circulation system can also be formed by combination with other external equipment (for example, in series with other irrigation beds). When there is no water plug but the settling pond is arranged, the tops of the water outlet and the connecting channel between the water outlet and the settling pond can be sealed so as to prevent the water from directly entering the water outlet without passing through the settling pond.

The irrigation bed described above can be applied to both substrate cultivation and water cultivation.

By reducing the contact area between the cultivation container and the surface of the irrigation bed to reduce local water accumulation caused by surface tension and further adopting a slope design to achieve complete drainage, the irrigation bed and the cultivation apparatus using the irrigation bed provided by the present invention solve the problem of water accumulation caused by incomplete drainage and the resulting problems that roots grow out of the cultivation container and seedlings grow irregularly, thereby achieving a good root control effect. The irrigation bed and the cultivation apparatus are beneficial to good growth of plants after planting, can improve the uniformity of seedlings, reduce the duration of seedling recovery and advance the flowering, and are of great significance to water irrigation and fertilizer application of protected agriculture and plant factories.

The technical effects of the present invention can be embodied by the following experiments.

Experiment Setting:

Treatment A: a sub-irrigation bed including support structures is used, where the bottom surface of the bed is inclined to a certain angle.

Treatment B: a sub-irrigation bed including support structures is used, where the bottom surface of the bed is horizontal.

Treatment C: a sub-irrigation bed without support structures is used, where the bottom surface of the bed is horizontal.

Measured Indexes Under the Same Management:
1. Root growth conditions during seedling growth.
2. Uniformity of plants.
3. Duration of seedling recovery and growth indexes of plants after seedling recovery.

Experiment Results:
1. Root growth conditions during seedling growth.

After seedlings of plants grow out, the roots in Treatment A do not grow out of bottom through holes in a tray as shown in FIG. SA, a small amount of roots in Treatment B grow out of bottom through holes in a tray due to a small amount of water accumulated at the bottom as shown in FIG. SB, and a large amount of roots in Treatment C grow out of through holes in a tray, as shown in FIG. SC.

Root Morphology of Seedlings.

Figure 6:
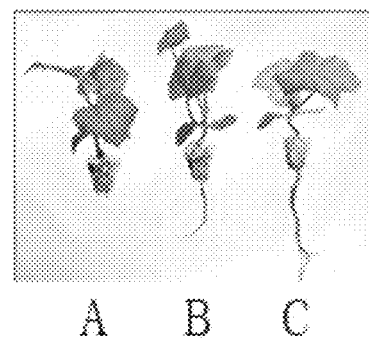
FIG. 6 shows comparative effect diagrams of root morphology of seedlings with substrates during seedling growth.
Figure 7:
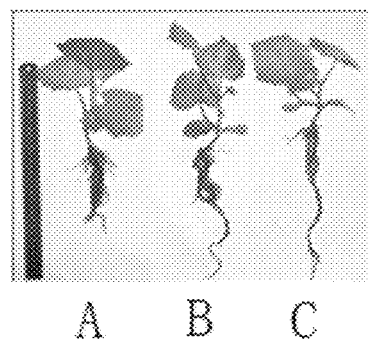
FIG. 7 shows comparative effect diagrams of root morphology of seedlings from which the substrates are washed off during seedling growth.
Figure 8:
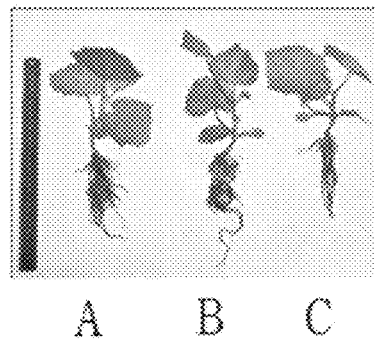
FIG. 8 shows comparative effect diagrams of root morphology of seedlings taken out of a cultivation container after seedling cultivation is finished.

When seedlings of cucumbers grow out, with the morphology of seedlings having substrates, the roots in Treatment A are completely wrapped around the substrates, most of roots in Treatment B are wrapped around the substrates and a small amount of roots in Treatment B grow out of the substrates, and most of roots in Treatment C grow out of the substrates, as shown in FIG. 6. After the substrates are washed off, the morphology of the roots is observed, the roots in Treatment A and Treatment B are developed, the number of fibrous roots in Treatment A and Treatment Bis significantly greater than that in Treatment C, and the roots in Treatment Care longer but the number of fibrous roots is small due to the fact that the roots in Treatment C grow out of the tray, as shown in FIG. 7. When the seedling cultivation is finished and seedlings are taken out from the cultivation container for transplanting, the roots in Treatment A can be completely taken out, the roots in Treatment B can also be completely taken out basically, the roots in Treatment A and Treatment B are significantly more developed than the roots in Treatment C, the roots in Treatment C are broken, only part of roots in Treatment C can be retained, and the length and number of the roots in Treatment Care significantly reduced, as shown in FIG. 8.

2. Uniformity of Plants.

Figure 9:
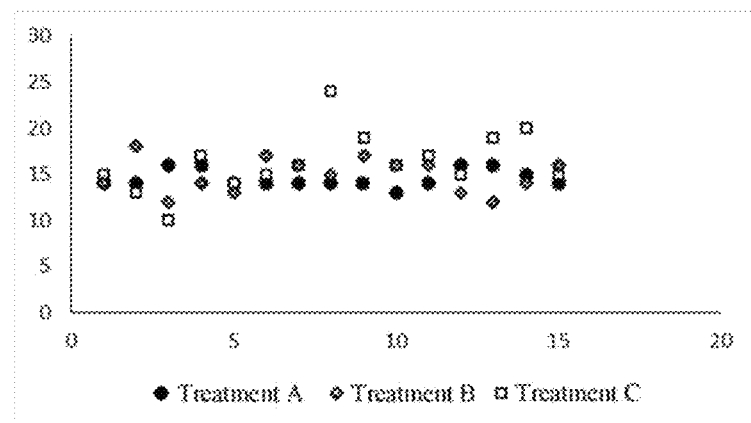
FIG. 9 shows a comparative statistical diagram of plant uniformity during seedling recovery.

After transplanting, the seedlings of the cucumbers are planted in the substrates, and after 7 days of seedling recovery, the plant height of each treated plant is compared. The seedlings cultivated in Treatment A have the highest uniformity during seedling recovery, and all values are evenly distributed between 13 cm and 16 cm. The seedlings cultivated in Treatment B have relative uniformity during seedling recovery, and all values are distributed between 12 cm and 18 cm. The seedlings cultivated in Treatment C have the worst uniformity during seedling recovery, and all values are distributed between 10 cm and 24 cm, as shown in FIG. 9.

3. Flowering Conditions after Seedling Recovery.

Figure 10:
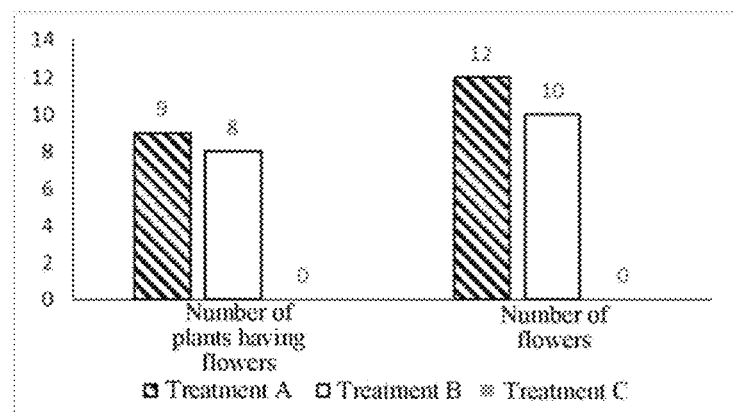
FIG. 10 shows a comparative statistical diagram of flowering conditions after seedling recovery.
Figure 11:
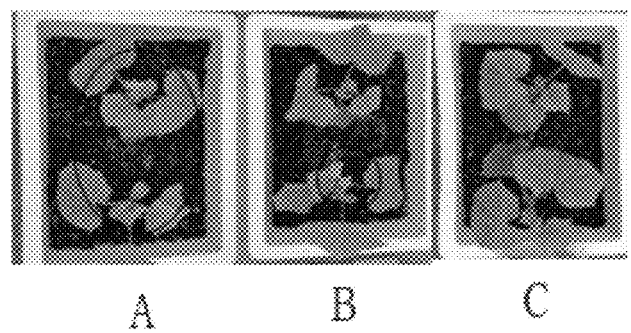
FIG. 11 shows comparative effect diagrams of flowering conditions after seedling recovery.

On the 8th day after seedling recovery, the number of flowers in each treatment is counted so as to reflect the effect of seedling recovery and the condition of new growth and development. Each of Treatment A, Treatment B and Treatment C has 16 seedlings, where 9 seedlings cultivated in Treatment A have flowers on the 8th day of seedling recovery and the number of flowers is 12, 8 seedlings cultivated in Treatment B have flowers on the 8th day of seedling recovery and the number of flowers is 10, and the seedlings cultivated in Treatment C have no flower on the 8th day of seedling recovery, indicating that the seedlings in Treatment A and Treatment B are better in seedling recovery and the seedling recovery period is also greatly shortened, as shown in FIGS. 10 and 11.

The above embodiments merely illustrate the principles and effects of the present invention, and are not intended to limit the present invention. Those skilled in the art can modify or change the above embodiments without departing from the spirit and scope of the present invention. Therefore, all equivalent modifications or changes made by a person of ordinary skill in the art without departing from the spirit and technical idea of the present invention should be covered by the claims of the present invention.

What is claimed is:

1. A sub-irrigation bed, comprising:
a bottom;
a side wall surrounding the bottom and consisting of comprising a first wall, a second wall opposite to the first wall, a third wall adjacent to the first wall and the second wall, and a fourth wall opposite to the third wall and adjacent to the first wall and the second wall;
a water inlet disposed on the first wall; and
a water outlet disposed on the second wall and equipped with a water plug configured to block the water outlet from communicating with the outside of the sub-irrigation bed, wherein the bottom is inclined downward from the water inlet to the water outlet;
a plurality of cylindrical support structures each separately spaced and arranged on an upper surface of the bottom, wherein the plurality of cylindrical support structures form an inline array having 17 rows and 10 columns and heights of the plurality of cylindrical support structures are gradually increased from the water inlet to the water outlet to ensure that tops of at least a part of the plurality of cylindrical support structures lie in the-same horizontal plane,
wherein each of the plurality of support structure is a hollow support structure; an entirety of an upper surface of the hollow support structure is mesh; and a periphery of the hollow support structure is provided with a plurality of drainage holes;
a settling pond formed on one side of the water outlet and in communication with the water outlet is formed at the bottom, wherein:
a filter tank is arranged at an upper part of the settling pond;
two curved water channels are formed on a side wall of the settling pond; the two curved water channels are perpendicular to the water outlet and outlets of the two curved water channels are disposed on opposite sides of the water outlet;
the two curved water channels are L-shaped and a fluid from the two curved water channels mix at the water outlet and flows in a direction perpendicular to a bottom of the settling pond;
the water plug blocks the water outlet for irrigating; water is fed from the water inlet; after reaching an irrigation level required by plants, the substrates begin to absorb water and fertilizer due to a capillary action; after the absorption ends, the water plug is opened, the remaining water and fertilizer flow to the settling pond along a slope under an action of gravity and flow into the settling pond through the filter tank; plant debris and substrate residues contained in the water and fertilizer are filtered when passing through the settling pond; the water and fertilizer flow through the settling pond, then flow to the water outlet through the two curved water channels and flow out of the water outlet; the filter tank can be removed and can be assembled back to the settling pond after impurities are cleared; and the substrates flowing out with water can be removed by removing the filter tank without moving the sub-irrigation bed, thus the water flows from the first wall to the second wall irreversibly; and
the sub-irrigation bed consists of a single reinforcing rib under the bottom, perpendicular to the same horizontal plane, and configured to support the bottom, wherein the cylindrical support structures disposed on the bottom from the first wall to the second wall and the cylindrical support structures disposed on the bottom from the third wall to the fourth wall form a rectangular shape; and the total number of the cylindrical support structures is 170.

2. The sub-irrigation bed according to claim 1, wherein the upper surface of the bottom is inclined downward towards the water outlet.

3. The sub-irrigation bed according to claim 1, wherein the filter tank is a removable filter tank.

4. The sub-irrigation bed according to claim 1, wherein the water plug is inserted into the water outlet and is configured to block the water outlet from communicating with an outside of the sub-irrigation bed.

5. The sub-irrigation bed according to claim 1, wherein the water plug is inserted into the water outlet and is configured to block the water outlet from communicating with the two curved water channels and block the water outlet from communicating with an outside of the sub-irrigation bed.

6. A cultivation apparatus, comprising a sub-irrigation bed comprising:
a bottom;
a side wall surrounding the bottom and consisting of a first wall, a second wall opposite to the first wall, a third wall adjacent to the first wall and the second wall, and a fourth wall opposite to the third wall and adjacent to the first wall and the second wall;
a water inlet disposed on the first wall;
a water outlet disposed on the second wall and equipped with a water plug configured to block the water outlet from communicating with the outside of the sub-irrigation bed, wherein the bottom is inclined downward from the water inlet to the water outlet; and
a plurality of cylindrical support structures each separately spaced and arranged on an upper surface of the bottom, wherein the plurality of cylindrical support structures form an inline array having 17 rows and 10 columns and heights of the plurality of cylindrical support structures are gradually increased from the water inlet to the water outlet to ensure that tops of at least a part of the plurality of cylindrical support structures lie in the-same horizontal plane, wherein each of the plurality of support structure is a hollow support structure; an entirety of an upper surface of the hollow support structure is mesh; and a periphery of the hollow support structure is provided with a plurality of drainage holes;

a settling pond in communication with the water outlet is formed at the bottom;

a filter tank is arranged at an upper part of the settling pond; and two curved water channels are formed on a side wall of the settling pond;

the two curved water channels are perpendicular to the water outlet and outlets of the two curved water channels are disposed on opposite sides of the water outlet;

the two curved water channels are L-shaped and a fluid from the two curved water channels mix at the water outlet and flows in a direction perpendicular to a bottom of the settling pond;

the water plug blocks the water outlet for irrigating; water is fed from the water inlet; after reaching an irrigation level required by plants, the substrates begin to absorb water and fertilizer due to a capillary action; after the absorption ends, the water plug is opened, the remaining water and fertilizer flow to the settling pond along a slope under an action of gravity and flow into the settling pond through the filter tank; plant debris and substrate residues contained in the water and fertilizer are filtered when passing through the settling pond; the water and fertilizer flow through the settling pond, then flow to the water outlet through the two curved water channels and flow out of the water outlet; and the filter tank can be removed and can be assembled back to the settling pond after impurities are cleared; and the substrates flowing out with water can be removed by removing the filter tank without moving the sub-irrigation bed, thus the water flows from the first wall to the second wall irreversibly; and the sub-irrigation bed consists of a single reinforcing rib under the bottom, perpendicular to the same horizontal plane, and configured to support the bottom, wherein the cylindrical support structures disposed on the bottom from the first wall to the second wall and the cylindrical support structures disposed on the bottom from the third wall to the fourth wall form a rectangular shape; and the total number of the cylindrical support structures is 170; and a cultivation container, wherein the cultivation container is supported on the plurality of cylindrical support structures of the sub-irrigation bed.

7. The sub-irrigation bed according to claim 6, wherein the filter tank is a removable filter tank.

8. The sub-irrigation bed according to claim 6, wherein the water plug is inserted into the water outlet and is configured to block the water outlet from communicating with the two curved water channels and block the water outlet from communicating with an outside of the sub-irrigation bed.

9. The cultivation apparatus according to claim 6, wherein the upper surface of the bottom is inclined downward towards the water outlet.

10. The cultivation apparatus according to claim 9, wherein the filter tank is a removable filter tank.

* * * * *